United States Patent
Finauer et al.

(10) Patent No.: US 11,238,882 B2
(45) Date of Patent: Feb. 1, 2022

(54) DRY SOUND AND AMBIENT SOUND SEPARATION

(71) Applicant: Harman Becker Automotive Systems GmbH, Karlsbad (DE)

(72) Inventors: Stefan Finauer, Munich (DE); Friedrich Von Turckheim, Hamburg (DE); Tobias Muench, Munich (DE); Christopher Lee, Stamford, CT (US)

(73) Assignee: Harman Becker Automotive Systems GmbH, Karlsbad (DE)

( * ) Notice: Subject to any disclaimer, the term of this patent is extended or adjusted under 35 U.S.C. 154(b) by 154 days.

(21) Appl. No.: 16/415,039

(22) Filed: May 17, 2019

(65) Prior Publication Data

US 2019/0362736 A1 Nov. 28, 2019

(30) Foreign Application Priority Data

May 23, 2018 (EP) .................................... 18173855

(51) Int. Cl.
*G10L 19/008* (2013.01)
*G10L 21/0308* (2013.01)
(Continued)

(52) U.S. Cl.
CPC ...... *G10L 21/0308* (2013.01); *G10L 21/0232* (2013.01); *G10L 21/0264* (2013.01); *G10L 2021/02082* (2013.01)

(58) Field of Classification Search
CPC ............ G10L 21/0308; G10L 21/0232; G10L 21/0264; G10L 21/0272; G10L 21/0208;
(Continued)

(56) References Cited

U.S. PATENT DOCUMENTS

| 6,259,793 B1* | 7/2001 | Washio ................ H04S 1/007 369/3 |
| RE43,191 E * | 2/2012 | Arslan ............... G10L 21/0208 704/226 |

(Continued)

FOREIGN PATENT DOCUMENTS

EP 2980789 A1 * 2/2016 ......... G10L 19/0204

OTHER PUBLICATIONS

Simon Leglaive, Roland Badeau, Gael Richard, Simon Leglaive, Roland Badeau, and Gael Richard. 2016. Multichannel Audio Source Separation With Probabilistic Reverberation Priors. IEEE/ACM Trans. Audio, Speech and Lang. Proc. 24, 12 (Dec. 2016), 2453-2465. (Year: 2016).*

(Continued)

*Primary Examiner* — Richemond Dorvil
*Assistant Examiner* — Rodrigo A Chavez
(74) *Attorney, Agent, or Firm* — Brooks Kushman P.C.

(57) ABSTRACT

A method for separating an audio input signal into a dry signal component and an ambient signal component is provided. The method includes generating a transferred input signal including transferring the audio input signal into frequency space and applying a smoothing filter to the transferred input signal to generate an estimated ambient signal component. The method includes determining the dry signal component based on the estimated ambient signal component and determining the ambient signal component based on the determined dry signal component and the audio input signal.

21 Claims, 10 Drawing Sheets

(51) Int. Cl.
*G10L 21/0232* (2013.01)
*G10L 21/0264* (2013.01)
*G10L 21/0272* (2013.01)
*G10L 21/0208* (2013.01)

(58) Field of Classification Search
CPC ... G10L 21/02082; G10L 21/02; G10L 21/25; G10L 19/008; G10L 2021/02082; G10L 2021/02087; G01H 7/00; H04S 5/00
USPC ......... 704/200, 226, E21.002, 500, 205, 233
See application file for complete search history.

(56) References Cited

U.S. PATENT DOCUMENTS

| | | | | |
|---|---|---|---|---|
| 8,280,731 | B2* | 10/2012 | Yu | G10L 21/0208 704/226 |
| 8,751,029 | B2* | 6/2014 | Soulodre | G01H 7/00 700/94 |
| 8,838,444 | B2* | 9/2014 | Vos | G10L 21/0208 704/226 |
| 8,886,527 | B2* | 11/2014 | Iwasawa | G10L 15/28 704/231 |
| 2003/0007648 | A1* | 1/2003 | Currell | H04S 7/305 381/61 |
| 2009/0080666 | A1* | 3/2009 | Uhle | H04R 5/04 381/17 |
| 2009/0092258 | A1 | 4/2009 | Merimaa et al. | |
| 2010/0182510 | A1* | 7/2010 | Gerkmann | G10L 21/0208 348/607 |
| 2012/0275613 | A1* | 11/2012 | Soulodre | H04S 7/301 381/63 |
| 2013/0208895 | A1 | 8/2013 | Horbach et al. | |
| 2013/0272533 | A1* | 10/2013 | Kojima | H04R 25/45 381/66 |
| 2015/0380000 | A1* | 12/2015 | Melkote | G10L 19/008 381/23 |
| 2015/0380002 | A1* | 12/2015 | Uhle | H04S 3/02 381/22 |
| 2016/0086618 | A1* | 3/2016 | Neoran | G10L 21/0264 704/205 |
| 2016/0210976 | A1* | 7/2016 | Lopez | G10L 19/0212 |
| 2018/0167747 | A1* | 6/2018 | Kuriger | H04S 7/305 |

OTHER PUBLICATIONS

S. Leglaive, R. Badeau and G. Richard, "Multichannel Audio Source Separation With Probabilistic Reverberation Priors," in IEEE/ACM Transactions on Audio, Speech, and Language Processing, vol. 24, No. 12, pp. 2453-2465, Dec. 2016 (Year: 2016).*

* cited by examiner

DRY SOUND AND AMBIENT SOUND SEPARATION

CROSS-REFERENCE TO RELATED APPLICATIONS

This application claims foreign priority benefits under 35 U.S.C. § 119(a)-(d) to EP Application Serial No. 18 173 855.0 filed May 23, 2018, the disclosure of which is hereby incorporated in its entirety by reference herein.

TECHNICAL FIELD

The present application relates to a method for separating an audio input signal into a dry signal component and an ambient signal component and to the corresponding audio module used for carrying out the message. Furthermore, a computer program and a carrier comprising the computer program is provided.

BACKGROUND

Audio signals that are replayed from different sources comprise a dry signal component and an ambient signal component comprising the indirect signal components which are generated when the dry signal components are interacting with the room in which the audio signal is recorded. In the audio industry applications are known in which mainly the dry signal component is needed or only the ambience signal component is needed. By way of example, in a stereo input signal which should be output by a 5.1 system, it is desired to output the dry signal components substantially with the front loudspeakers, where the ambience signal components are output by the rear loudspeakers. Another application is the amplification of the ambient signal component in an audio signal.

Accordingly, a need exists to be able to effectively determine a dry signal component or an ambient signal component in an audio input signal which comprises both components.

SUMMARY

This need is met by the features of the independent claims. Further aspects are described the dependent claims.

According to a first aspect a method for separating an audio input signal into a dry signal component and the ambient signal component is provided in which a transferred input signal is generated including transferring the audio input signal into frequency space. In the frequency space, a smoothing filter is applied to the transfer input signal to generate an estimated ambient signal component. Based on the estimated ambient signal component the dry signal component is determined and the ambient signal component is then determined based on the determined dry signal component and the audio input signal.

With the smoothing filter it is possible to extract the ambient signal component as the speed of the amplitude changes in the audio input signal originating from the ambient signal component are low. When a smoothing filter is applied, the dry signal component can be suppressed and the estimated ambient component can be generated. Based on the estimated ambient signal component it is possible to determine the dry signal component and the ambient signal component can then be determined using the determined dry signal component and the audio signal input, by way of example when the ambient signal component is subtracted from the audio input. This subtraction may be carried out in the frequency space, however it should be understood that it is possible to do this determination in the time domain.

Furthermore, an audio module configured to separate an audio input signal into a dry signal component and an ambient signal component is provided. The audio module comprises a memory in at least one processing unit in which the memory comprises instructions executable by the at least one processing unit. The audio module is then operative to carry out the steps mentioned above or the steps discussed in further detail below.

Additionally, a computer program comprising program code is provided wherein execution of the program code causes the at least one processing unit to execute a method as discussed above or as explained in further detail below.

A carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above and below mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
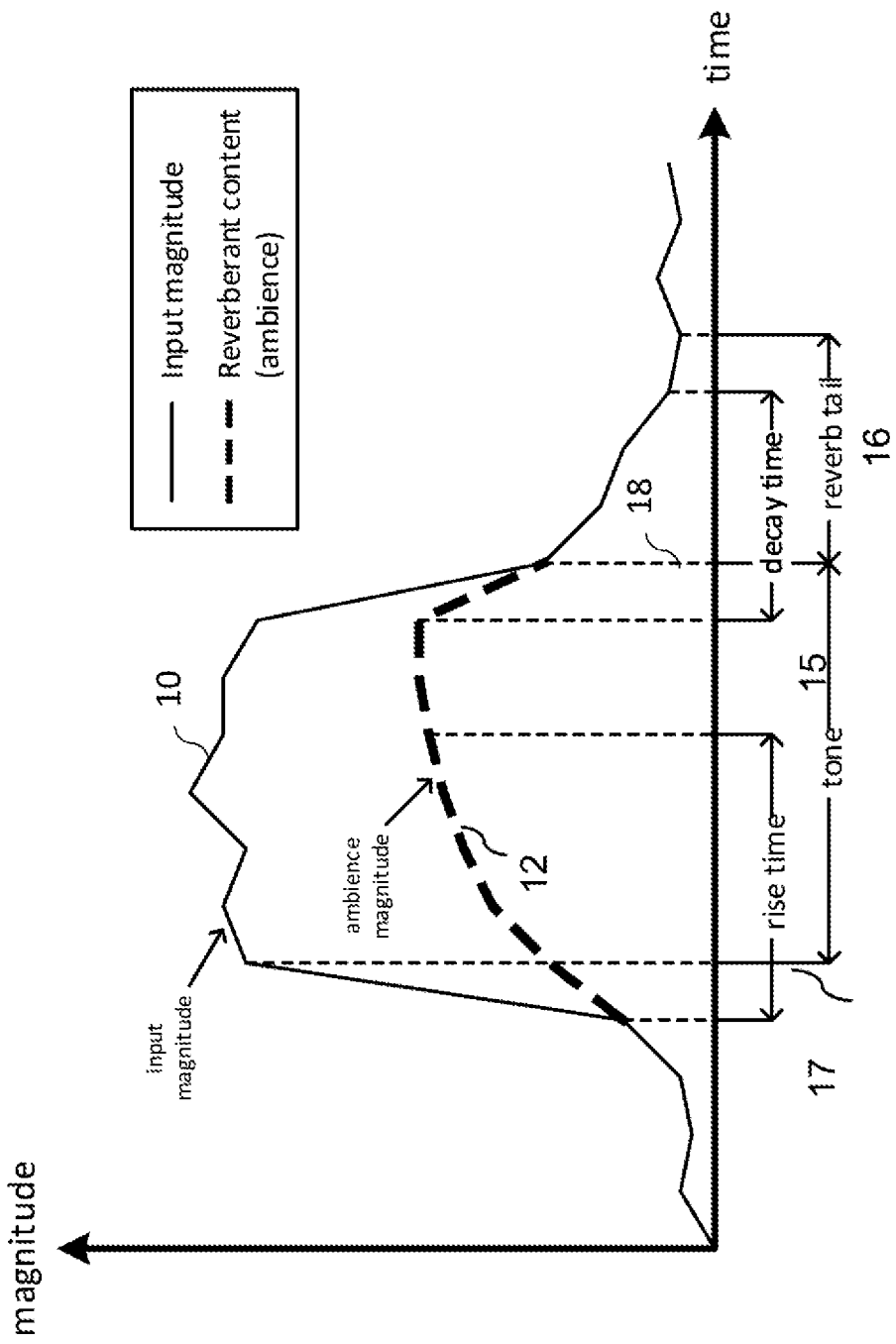
FIG. 1 shows a schematic view of an audio input signal including an ambience magnitude in a single frequency bin over time.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

FIG. 1 shows a schematic view of an audio input signal 10 which was transferred into a frequency space and separated into different bins wherein the signal is shown for one frequency bin over time including the input magnitude 10 which comprises an ambience magnitude 12. When a tone starts to be present in the input signal the onset 17 is present, wherein when the tone stops the offset 18 is present. As can be seen the time period between the onset and the offset the input signal comprises a dry signal component which is not known and not shown and the ambient signal component 12. After this combined signal period 15, a reverberation signal period 16 is following in which mainly the ambient signal is present. The part in the reverberation signal period is also called reverberation tail and in most rooms this reverberation tail has exponential decay characteristics. In the same way the reverberation amplitude raises in an exponential manner as shown in FIG. 1 when acoustic energy is fed into a room continuously. When a tone is played through an instrument or via a loudspeaker, the direct and the ambient sound are superposed until the tone stops at the offset 18 and the reverberation part, the ambient signal component becomes obvious. In a recording comprising both the dry and the ambient signal components, the ambient component can be extracted by limiting the speed of amplitude changes for every frequency bin, by way of example with a first order recursive filter in order to achieve an exponential rise and a decay according to the acoustics in a real room.

Figure 2:
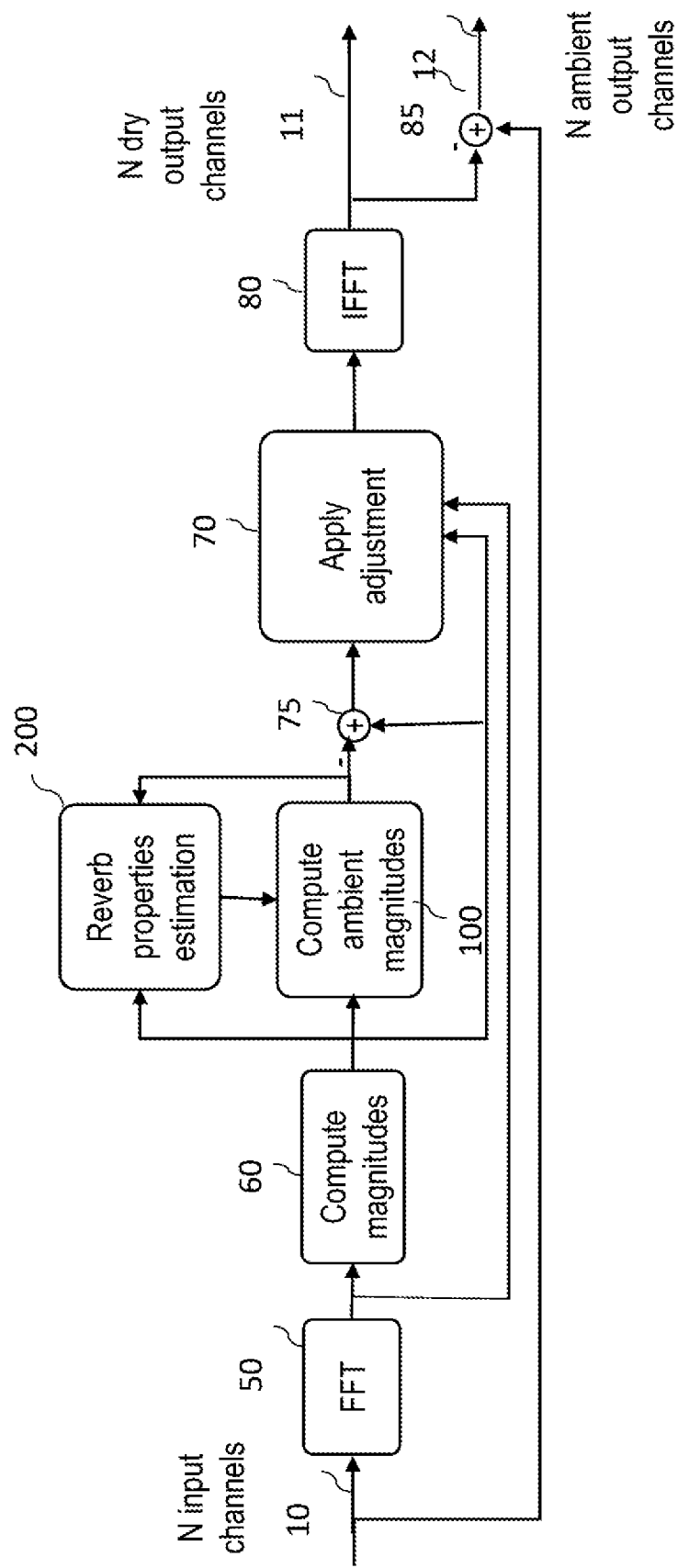
FIG. 2 shows an overview over a module with the components needed to separate the dry from the ambient signal components in the audio input signal.

FIG. 2 shows a schematic overview over the main steps carried out during a signal processing the audio input signal in order to separate the ambient signal component from the dry signal component of the audio input signal 10.

As shown in FIG. 2, the audio input signal 10 is processed in several processing modules shown in FIG. 2 wherein this process is carried out for each channel of the input signal separately. Accordingly, the proposed method works with any number of audio channels including mono. After transferring the audio input signal into the frequency domain with a Fourier transform in module 50 using Short-Time Fourier Transform, (STFT) magnitudes are computed for each timeframe in module 60 and are smoothed in module 100 based on parameters obtained from the analysis of the input signal estimated in estimation module 200. To this end overlapping windows of the time signal may be used. In module 100, a smoothing filter is applied to the signal as will be explained in further detail below which suppresses the dry signal components so that the output represents an ambient part of the signal. By subtracting the ambient part from the input signal in adder 75, an estimated dry magnitude is present at the output of the adder 75. In module 70, a magnitude adjustment is applied to the signal so that magnitudes of the dry signal content are extracted and applied to the frequency domain input signal and then transferred back into the time domain in module 80. Accordingly, at the output of module 80, the N dry output signal components are present. When the dry components are known, the ambient components can be generated by subtracting the dry signal components from the input signal 10 to obtain the N ambient output channels 12 as shown in FIG. 2.

In the following, the signal flow of the different modules is explained in more detail. In module 50, a short-term Fourier transform, STFT is carried out transforming the audio input signal 10 from the time domain to the frequency domain. The fast Fourier transform can be used due to computational efficiency, but other types of transformation such as other implementations of a digital Fourier transform, cosine transform of wavelet transform can be applied. The time domain input can be split into blocks of length N/2 samples. A windowing, optionally a zero padding and the actual fast Fourier transform operation is executed. The output of one transformation of N input samples is a block of N complex spectra bins in a real/imaginary representation when no zero padding is applied.

In module 60, magnitudes are computed for every time frequency bin from the complex input spectra in a real and imaginary representation.

Figure 3:
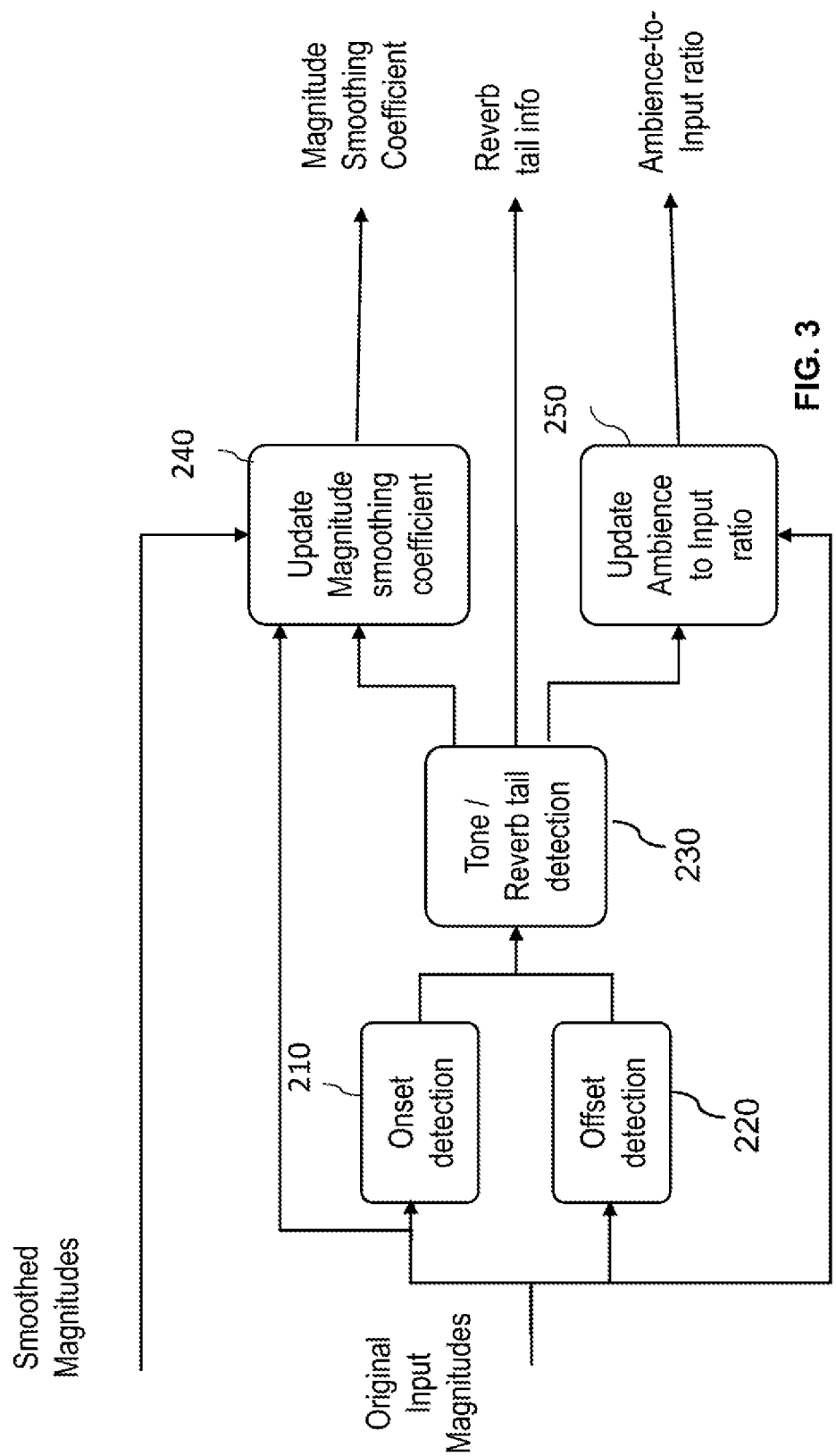
FIG. 3 shows a detailed view of the reverberation property estimation carried out in FIG. 2.

In module 200, several parameters are determined which are then used in module 100 for the estimation of the ambient signal component. The input magnitudes as output from module 60 are used, as shown in FIG. 3 for the onset detection module 210 and the offset detection module 220. In the offset detection module 220, a peak follower curve with exponential decay is computed for each frequency bin based on the input magnitude. The peak follower curve is attenuated in the range from 0 to 1 by a tunable factor $a_{pf}(k)$ such as 0.4. As shown in FIG. 1 the decay time of the peak follower corresponds to the currently estimated reverb time or a tunable factor or a combination of both. An offset is detected as shown in FIG. 1 when the input amplitude crosses the attenuated peak follower curve in a downward direction.

In the onset detection module 210, an onset is observed when the smoothed actual input magnitude rises with a slope steeper than a tunable threshold value, by way of example, when the ratio between two consecutive samples exceeds a certain limit, then the onset 17 shown in FIG. 1 is detected. The threshold may be automatically adjusted based on the currently estimated decay rate. It may also be frequency dependent. The threshold value should be greater than 1.

In module 230, a tone and a reverb tail detection is carried out. A reverb tail or the reverberation signal period 16 starts after an offset and lasts until the smoothed magnitude starts rising again. This is the case when the new value of the smooth magnitude is greater than the previous one. The input magnitudes could also be used to determine the end of the reverberation signal period 16, but it is more difficult because it's amplitude has no clean exponential decay, but some fluctuations which makes it more difficult to detect the end of the reverberation signal period. A tone is detected between the onset 17 and the offset 18. Based on the nature of the observation method, several onsets can be detected without offsets in between. When this is the case, neither tone, nor reverberation signal period are detected. In the following, the tone period is also named combined signal period where the ambient signal component and the dry signal component is present. A number of STFT blocks between the latest onset and a consequent onset is used to measure the tone length.

In module 240, a smoothing coefficient which is used later on in the smoothing filter contained in module 100 is updated. To this end, a deviation between an estimated amplitude as output from the smoothing filter in module 100 and the audio input amplitude is evaluated individually for each frequency bin during the reverberation signal period 16. Once the beginning of a reverberation signal period or reverb tail is indicated by the offset detection 220, the course of the estimated and the smoothed actually reverb tails are both recorded into buffers. This is done for every transformed signal block until one of the following criteria is fulfilled:

the end of the reverb tail or reverberation signal period is detected, both the estimated and the smooth actual reverb tail have dropped by more than a defined threshold, for example, 10 dB compared to the first bin after offset detection. A 10 dB drop may be used to determine the early decay time for room reverberation and maybe an appropriate value, but other values may be, or a maximum number of samples has been reached, meaning that the buffers are full.

When at least one of the above criteria is fulfilled, an offset factor is applied to the estimated ambient signal component so that the first sample in the reverberation signal period has the same magnitude as the smoothed actual reverb tail. Then the two reverb tails are compared, meaning the estimated reverberation signal component computed by the smoothing filter in module 100 and the audio input signal 10 are compared in the reverberation signal period by computing the difference for each timeframe in the current frequency bin. The average of the difference can be multiplied by a tunable scaling factor, smoothed over time to avoid hard jumps. The current recursion factor can then be updated by adding the resulting value as an offset to the current recursion factor.

Figure 5:
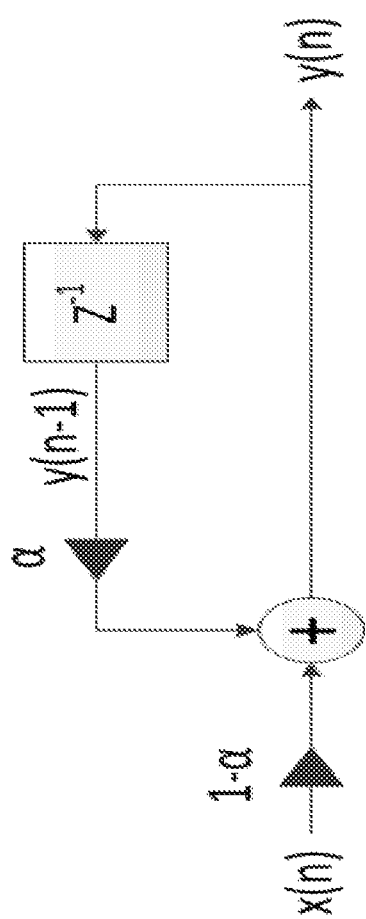
FIG. 5 shows a schematic view of the smoothing recursive filter used in the separation of the audio input signal into the dry signal component and the ambient signal component.

Accordingly, the output of module 240 is the magnitude smoothing coefficient α discussed in more detil in connection with FIG. 5

In module 250, an ambience to input ratio is determined and updated. Especially after long tones, the ambience to input ratio can be estimated by inspecting the amplitude drop at the tone offset 18. After the dry signal stops, only the ambient signal component is present. The difference between the last sample before the offset 18 and the sample when the offset was detected might be used for an approximation for the ambience to input ratio. The longer a tone is played, the more accurate is this approximation as the ambient energy in the room with the exponential raise gets closer to saturation. This is taken into account by recording the length of the last tone and weighting the contribution of the latest measurement to the determination of an average ambience-to-input-ratio depending on the tone length. The contribution can be weighted by applying a recursive filter to the ambience-to-input-ratio estimation, whose recursion factor depends on the tone length. The longer a tone, the higher the influence of the latest measurement is and vice versa. In addition, a minimum required tone length may be used for updating of the estimation of the ambience-to-input-ratio in order to avoid estimation updates based on very short tones.

Accordingly, the output of module 250 is an average ambience to input ratio, the output of module 230 is the information when the reverberation signal period 16 starts.

As explained in further detail in connection with FIG. 4, these three pieces of information are used in the computation of the ambient magnitudes 100 which is discussed in further detail in connection with FIG. 4.

Figure 4:
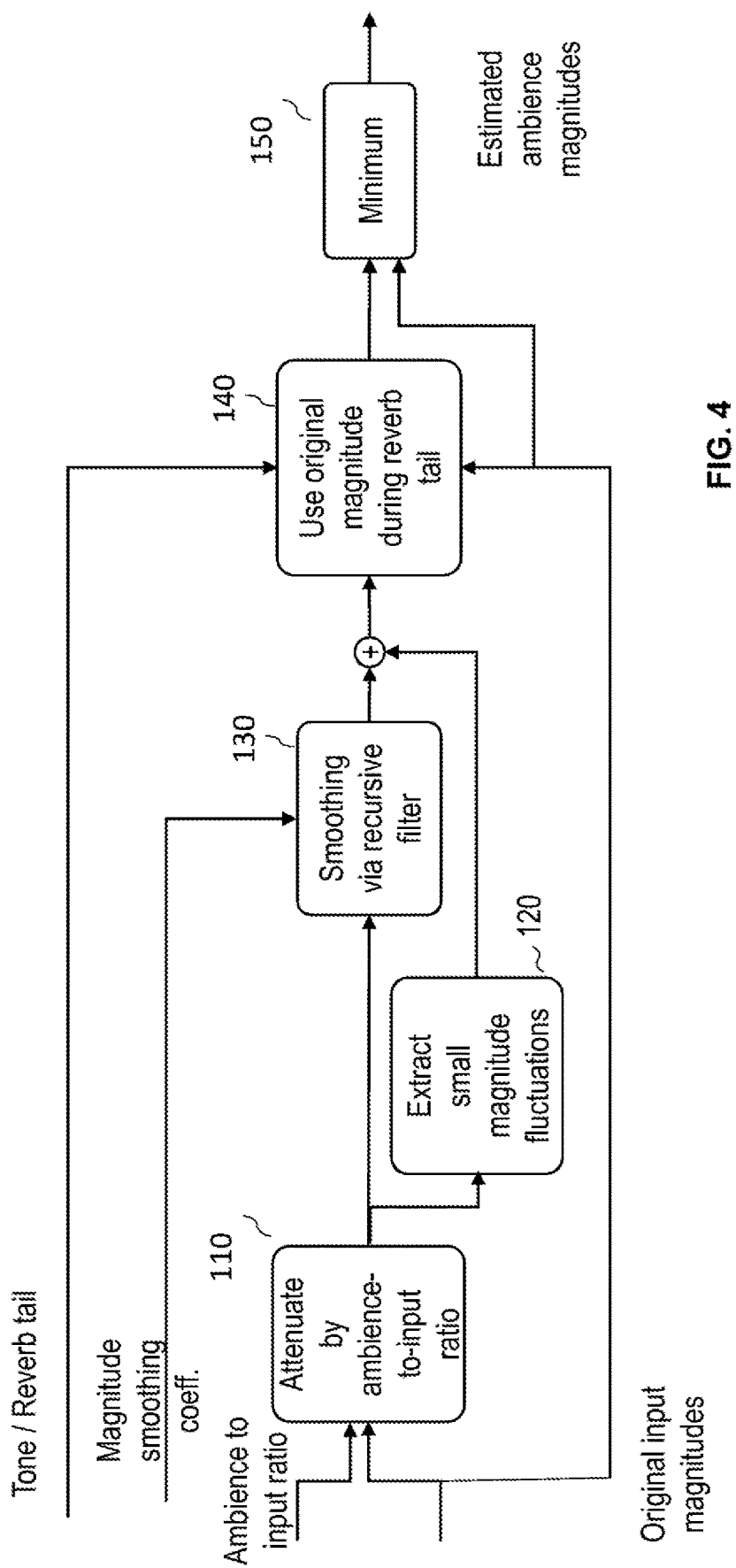
FIG. 4 shows a more detailed view of the computation of the ambient magnitudes carried out in FIG. 2.

As shown in FIG. 4, a recursive filter 130 is used for smoothing. However, before entering the smoothing filter 130, the original input magnitudes are attenuated by the ambience-to-input-ratio which was estimated as discussed above in connection with FIG. 3. Otherwise the output of the smoothing filter would converge to the original input amplitude for long tones. In a real room, however, ambient energy is usually significantly lower than the input energy due to wall absorption.

The ambient content in real rooms however, never shows the exact exponential rise or decay, but has small, noise like fluctuations due to random phase superposition. Accordingly, in module 120, small fluctuations are extracted from the attenuated magnitudes and are added after the smoothing in filter 130 to make it sound more natural. The fluctuations can be extracted by smoothing magnitudes, for example, a moving average filter or another recursive filter with a short time constant and subtracting the filtered signal from the audio input signal 10. During the detected reverberation signal period 16, the original magnitudes can be used for the ambience magnitude estimation, otherwise the smoothed attenuated magnitudes with added fluctuations are used which is particularly relevant during tones.

One aspect of the separation is the smoothing with the recursive filter 130. This smoothing is applied to all magnitudes individually. This limits the rise and decay times according to the smoothed latest estimation of the reverberation property estimation stage and generates magnitudes which rise and decay with exponential shape and individual time constants according to the actual reverberation in the room. Accordingly, the output of the recoursive filter 130 is a signal similar to the signal 12 shown in FIG. 1.

As shown in FIG. 5, a first order recursive lowpass filter with a feedback or smoothing coefficient a between zero and one may be used and a forward coefficient 1−α, as it provides exponential rise and decay and can be implemented at low processing cost. The diagram of the recursive filter also known as leaky integrator is shown in FIG. 5.

The corresponding formula is:

$$y(n)=(1-\alpha)\cdot x(n)+\alpha\cdot y(n-1)$$

Even though a leaky integrator is an appropriate and efficient method to perform the magnitude smoothing operation, it is also possible to use other types of filters that are capable of smoothing the magnitudes in a controlled way.

Finally, in module 150, the estimated ambience magnitudes are limited so that they can never be greater than the original input magnitudes. This is a safety measure as the ambient content in a signal can never be greater than the input.

Returning again to FIG. 2, the output of module 100 is the estimated ambience magnitudes as discussed above in connection with FIG. 4. When the ambience magnitudes are subtracted from the input magnitudes in adder 75, the dry magnitudes are present after adder 75.

The phase values of the frequency domain input signal could be combined with the output of the magnitude shaping block. However, it is computationally more efficient to multiply the real and imaginary parts of the complex input spectra in the real and imaginary representation by the ratio of the dry and original input magnitudes in the module 70. Last but not least, in module 180, the inverse short-term Fourier transform is carried out in which the signal is transformed back into the time domain. Inverse Fourier transform IFFT may also be used, but other transformation implementations can be used. N complex frequency spectra bins in a real and imaginary representation are transferred to the time domain. This module 180 can also incorporate overlap add functionality required to reconstruct the time domain signal properly. The overlap-add method of digital filtering may involve using a series of overlapping Hanning windowed segments of the input waveform and filtering each segment separately in the frequency domain as disclosed in more detail in US 2013/0208895 A1. After filtering, the segments may be recombined by adding the overlapped sections together. The overlap-add method may permit frequency domain filtering to be performed on continuous signals in real time, without excessive memory requirements.

Figure 6:
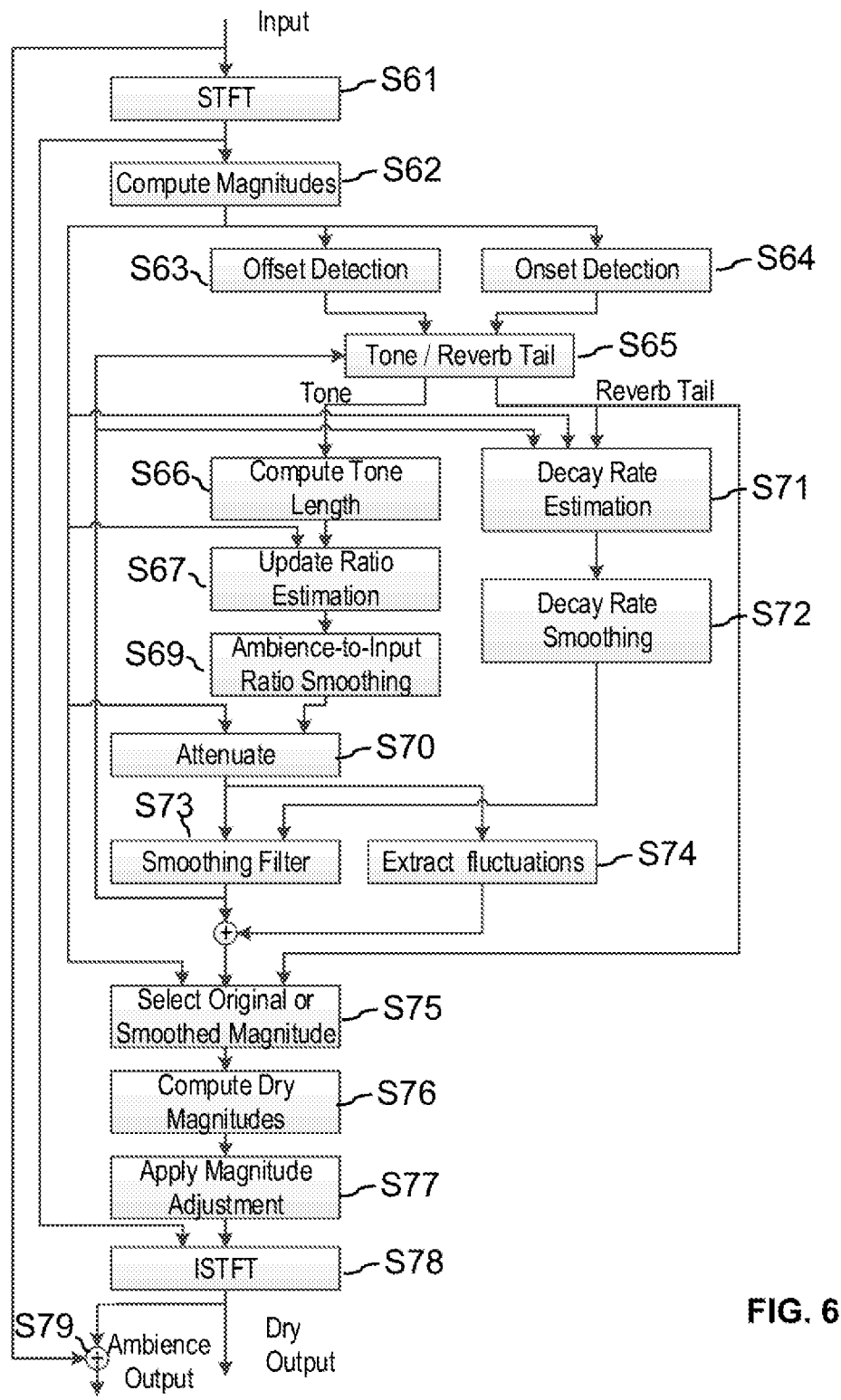
FIG. 6 shows an example flowchart of a method used to process the audio input signal in order to determine the dry and the ambient signal component.

FIG. 6 shows an overview and a more detailed signal flow diagram from the input channels 10 on the left side of FIG. 2 to the dry output channels 11 alone and the N ambient output channels 12 on the right side of FIG. 2. In step S61, the signal is transformed into the frequency space and in step S62, the magnitudes are computed as discussed above in connection with FIG. 2. The computed magnitudes are then used for the offset detection in step S63 and the onset detection in step S64. When the offset and the onset is known, it is possible to separate the audio input signal into the combined signal period 15 where the tone is present and the reverberation signal period 16 were mainly the ambient signal is present. In the combined signal period 15, the tone length is determined in step S66 and in step S67 the ambience-to-input-ratio estimation is updated as discussed above in connection with module 250. In step S68, the ambience to input ratio smoothing is carried out so that the output after step S68 is the ambience to input ratio which is used to attenuate the input magnitudes in step S70. In the reverberation signal period, the decay rate estimation is carried out in step S71, so that the decay rate is obtained after this step. In step S72, the decay rate smoothing is carried out which provides the recursion factor a used in the smoothing filter. Accordingly, in step S73, the first order recursive filtering is carried out using the recursion factor or smoothing coefficient α. Furthermore, the fluctuations are extracted and added to the smoothed signal as discussed above in connection with FIG. 4. In step S75, either the original input magnitude or the smoothed magnitude from the input signal is selected based on the fact whether the audio signal is in the combined signal period or in the reverberation signal period 16. As will be explained in connection with FIG. 7, when the signal is in the reverberation signal period, the original input magnitudes are used whereas when the signal is in the combined signal period the smoothed magnitude signals are used in step S75. Based on this information it is then possible to compute the dry magnitudes by subtracting the estimated ambient signal component as output from the module 100 from the input signal (S76). In step S77, the magnitude adjustment is carried out as explained above in connection with FIG. 2 and after the transformation back in that time space, the dry signal component is present in the signal wherein the ambient signal component can be determined by subtracting the dry signal component from the input signal.

Figure 7:
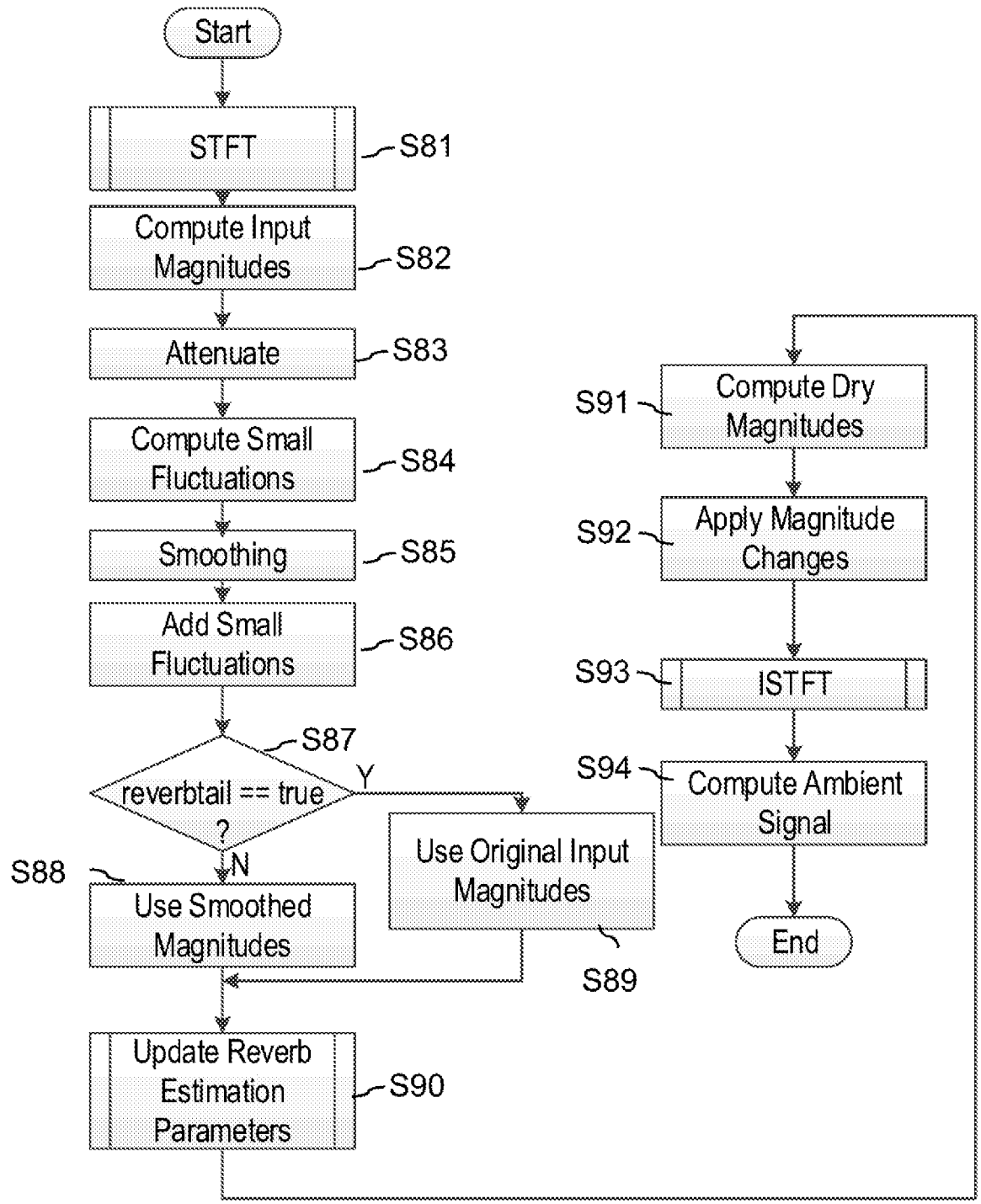
FIG. 7 shows another example flowchart of a method of the processing steps carried out in the audio signal in order to determine the dry and ambient signal component.

FIG. 7 shows the flow chart comprising only the actual audio processing steps. After the start of the method, the signal is transformed in the frequency domain in step S81 and the input magnitudes are computed in step S82, for example, in the module 60 as discussed in connection with FIG. 2. As discussed in connection with FIG. 4, the signal is attenuated by the ambience to input ratio in step S83 and the small fluctuations are determined in step S84. In step S85 the smoothing with the recursive filter is carried out as discussed in connection with FIG. 4 and in step S86 the small fluctuations are added. It is then checked, in step S87, whether the current signal is in the reverberation signal period 16 or the combined signal period 15. If it is in the combined signal period 15, where the dry and the ambient signal is present, the smoothed magnitudes are used in step S88. However, if the signal is in the reverb tail, the original input signals are used in step S89. Accordingly, after step S88 and S89, an estimated ambience sound signal is present, and in step S90, it is possible to update the estimation of the reverberation parameters such as the ambience-to-input ratio and the magnitude smoothing coefficient. In step S91, the dry magnitudes are computed and the magnitude changes are applied in step S92 corresponding to the adjustment carried out in the module 70 discussed in connection with FIG. 2.

After the inverse Fourier transformance step S93, in addition to the dry output signals, it is then possible to compute the ambient signals in adder 85 as discussed in connection with FIG. 2.

Figure 8:
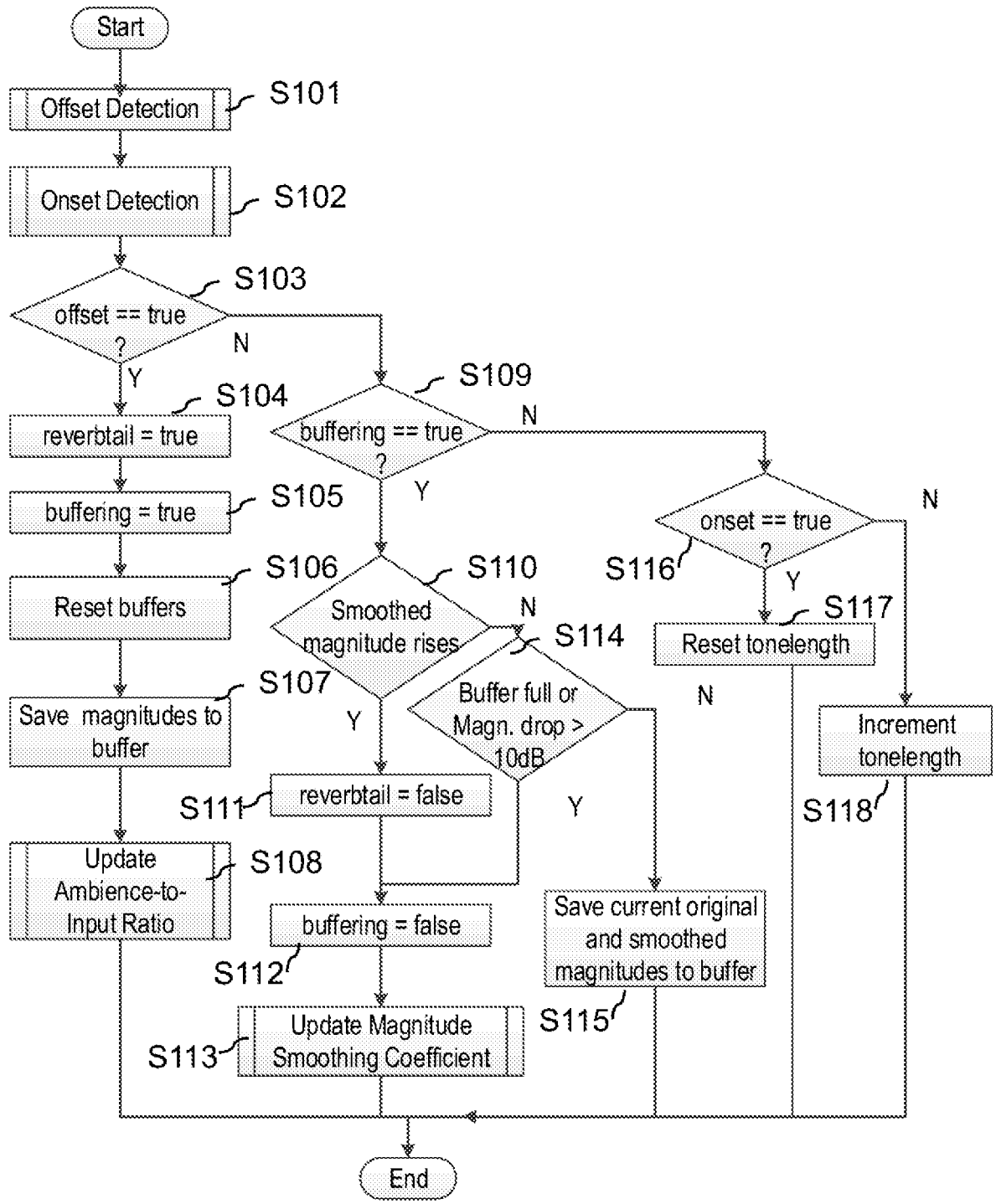
FIG. 8 shows an example flowchart of a method comprising the steps for the processing of the reverberation component present in the ambient sound signal component.

FIG. 8 shows a more detailed flowchart of the processing of the reverberation parameters. In step S101, the offset detection is carried out as discussed above in connection with FIG. 3 in module 220. Furthermore, the onset detection is carried out in step S102. In step S103, it is checked whether an offset can be detected. If this is the case, it can be determined in step S104 that the actual signal is in the reverberation signal period so that a buffering should be carried out in step S105 of the signal. For storing the estimated reverb tails and the actual reverb tails, the buffers are reset in step S106 and the magnitudes are saved into the buffers. In step S108, the ambience-to-input-ratio is updated.

Returning to the decision in step S103 if an offset cannot be detected, it is checked whether a buffering is carried out in step S109. If this is the case, it is checked in step S110 whether the smoothed magnitude rises. If this is the case, it can be determined in step S111 that the signal is not in the reverb tail so that no buffering should be carried out in step S112. The magnitude is updated accordingly in step S113. Returning again to step S110, if it is determined that the magnitude does not raise, it is determined in step S114 whether the buffer is full or the magnitude drop is higher than 10 dB. When the buffer is not full and the magnitude drop is not higher than 10 dB, it can be deduced that the signal is still in the reverberation tail so that the current original and the smooth magnitudes can be saved into the buffer in step S115. As discussed in connection with FIGS. 2 and 3, the two reverb tails are then compared by computing the difference between the actual and the estimated reverb tail for each timeframe.

Returning again to step S109, when no buffering is carried out, it is determined in step S116 whether an onset is detected in the audio input signal. If this is the case, the tone length is reset in step S117 and if this is not the case, then the tone length is incremented in step S118.

Figure 9:
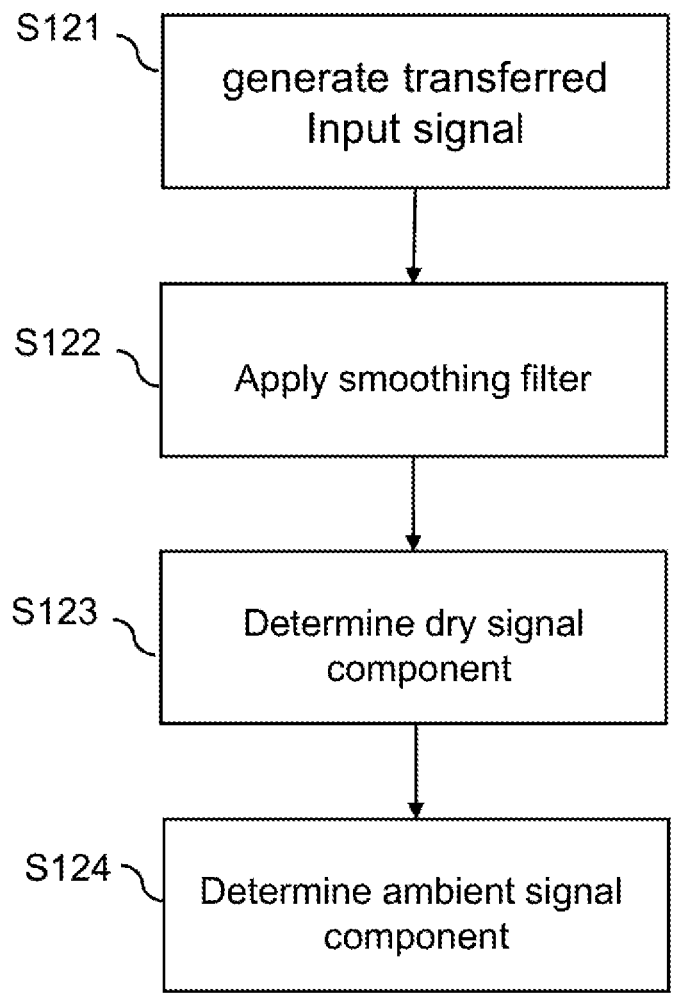
FIG. 9 shows an example flowchart of a method carried out to separate the input signal into a dry and into an ambience signal component.

FIG. 9 summarizes some of the steps carried out for the audio input signal 10. In step S121, the transferred input signal is generated from the audio input signal 10. In step S122, a smoothing filter is applied to generate an estimated ambience signal component. The estimated ambient signal component is the component present after the module 100 shown in FIG. 2. In step S123, it is then possible to determine the dry signal component, for example, by subtracting the estimated ambient component from the audio input signal 10. When the dry signal component is known, the actual ambient signal component can be determined in step S124, for example, by subtracting it from the audio input signal 10 in the adder 85 shown in FIG. 2.

Figure 10:
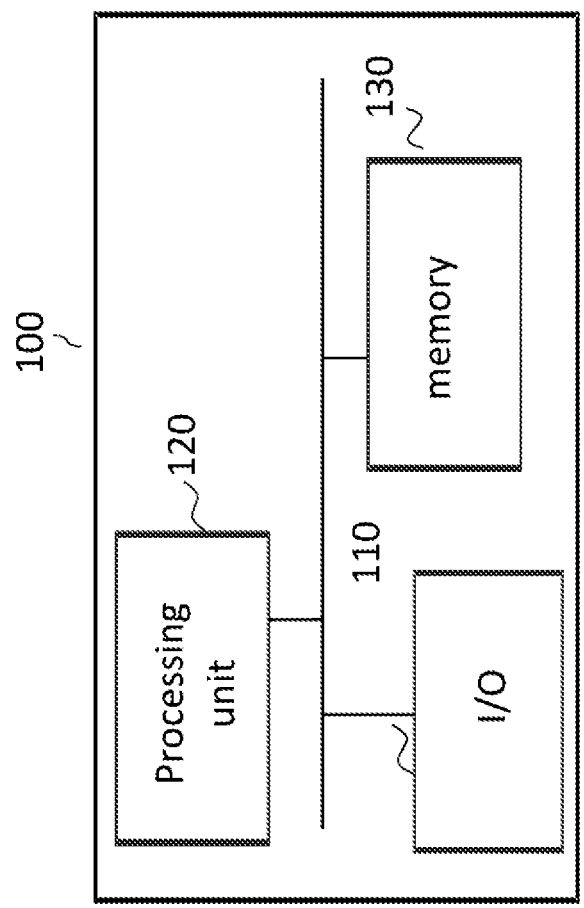
FIG. 10 shows an example somatic representation of an audio module configured to separate the audio signal into the different components as discussed in connection with FIGS. 1 to 9.

FIG. 10 shows a schematic architectural view of an audio module which can carry out the processing steps discussed above in connection with FIGS. 2 to 8. The audio module can carry out the above discussed separation and comprises an input output module 110 for receiving the N input channels and for outputting the N dry output channels 11 and the N ambient output channels 12. The module 100 includes a processing unit 120 comprising one or more processors and can carry out the instructions stored on a memory 130. The memory can include a read-only memory, a random access memory, a mass storage, a hard disk or the like. The memory 130 can furthermore include suitable program code to be executed by the processing unit 120 so as to implement the above described functionalities of the separation of the audio input signal 10 into a dry and ambient signal component.

From the above, some general conclusions can be drawn. The audio input signal 10 can include a combined signal period 15 having both components as shown in FIG. 2 and a reverberation signal period 16 following the combined signal period 15. It is possible to detect the reverberation signal period 16 in the audio input signal 10. Then an estimated reverberation signal component is determined in the estimated ambient signal component output from the filter in the reverberation signal period and the estimated reverberation signal component is compared to the audio input signal 10 in the reverberation signal period in to determine a smoothing coefficient used in the smoothing filter for generating the estimated ambient signal component.

As discussed above, the filter output corresponding to the estimated ambient signal component is compared to the input signal in the period 16 and based on this comparison, the smoothing coefficient can be determined. This smoothing coefficient can be between zero and one and as can be deduced from the above equation of the smoothing filter, a high smoothing coefficient a is indicative of a large smoothing that is applied. As shown in FIG. 5, in the recursive filter, a high a indicates that a high part of an older signal is used and only a low part of the new signal.

The smoothing filter can be a first order recursive filter, however, other filters may be used.

Furthermore, the magnitudes of the transferred input signal are determined and the determined magnitudes are attenuated before applying the smoothing filter. The attenuation is carried out as the estimated ambient signal component as determined with the smoothing filter is not higher than the audio input signal 10. The attenuation can be carried out using the estimation of the ambience-to-input-ratio.

Furthermore, it is possible to determine an onset 17 in the audio signal where a significant amount of the dry signal component starts to be present in the audio input signal, or in other words where the tone is present in the audio input signal. Furthermore, the offset 18 can be determined where the significant amount of the dry signal component stops to be present in the audio input signal.

The reverberation signal period can then be determined as starting after the offset 18 and ending when an output of the smoothing filter meets a predefined criterion such as when the output of the smoothing filter starts to increase again. The comparing of the estimated reverberation signal component to the audio input signal in the reverberation signal period is then carried out in the part of the audio signal after the determined offset, namely in the reverberation signal period.

Furthermore, it is possible to determine an amplitude in the audio input signal 10 in a last sample of the audio input before the offset and the amplitude of the audio input signal in the first sample after the offset. The ratio of the ambient signal component to the audio input signal 10 is then determined based on the amplitudes in the first and the last sample.

This determination of the ratio based on the last sample and the first sample can be repeated several times for different offsets in the input signal to determine an average ratio used to attenuate the magnitudes of the transferred input signal. Furthermore, a length of the dry signal component is determined from different offsets and the longer the determined dry signal component is, the more the corresponding ratio contributes to the average ratio.

As discussed above the longer a tone is played, the more accurate the determination of the ambience to input ratio is.

Furthermore, it can be determined whether the reverberation signal period is currently present in the audio input signal. If this is the case, the audio input signal in the reverberation signal period is used for the estimated ambient signal component and if this is not the case, the output of the smoothing filter is used for the estimated ambient signal component.

Furthermore, it is possible to extract fluctuations from the attenuated magnitudes of the transfer input signal and to add the extract fluctuations to the output of the smoothing filter to determine the estimated ambient signal component.

Additionally, it is possible to determine a peak follower signal with exponential decay from the input signal, which is then attenuated by a factor between 0 and 1, where the offset is detected when the audio input signal 10 crosses the attenuated peak follower signal at a point where the input signal decreases.

The smoothing coefficient detected as discussed in connection with FIG. 3, can be determined such that the estimated reverberation signal component, corresponds to the audio input signal in the reverb tail.

The estimated ambient signal component may be determined based on the output after smoothing filter, namely after the subtraction carried out in the adder 75 providing the dry output channels which is then subtracted from the audio input signal 10 to determine the ambient signal components present and the audio input signal.

Summarizing, with the above method, an effective separation of a dry signal component and an ambient signal component in an audio input signal is possible.

What is claimed is:

1. A method for separating an audio input signal into a dry signal component and an ambient signal component, the method comprising:
generating a transferred input signal including transferring the audio input signal into a frequency space,
applying a smoothing filter to the transferred input signal to generate an estimated ambient signal component,
determining the dry signal component based on the estimated ambient signal component, and
determining the ambient signal component based on the determined dry signal component and the audio input signal,
wherein applying the smoothing filter to the transferred input signal to generate the estimated ambient signal component includes suppressing the dry signal component of the audio input signal with the smoothing filter to generate the estimated ambient signal component, and wherein the audio input signal comprises a combined signal period, where the ambient signal component and the dry signal component are present and a reverberation signal period following the combined signal period, and where substantially only the ambient signal is present, the method further comprising:
detecting the reverberation signal period in the audio input signal,
determining an estimated reverberation signal period component in the estimated ambient signal component in the reverberation signal period, and
comparing the estimated reverberation signal component to the audio input signal in the reverberation signal period to determine a smoothing coefficient used in the smoothing filter for generating the estimated ambient signal component,
wherein the method further comprises:
determining whether the reverberation signal period is currently present in the audio input signal,
utilizing the audio input signal in the reverberation signal period for the estimated ambient signal component if the reverberation signal period is present in the audio input signal, and
utilizing an output of the smoothing filter for the estimated ambient signal component if the reverberation signal period is not present in the audio input signal.

2. The method of claim 1, wherein the smoothing coefficient is determined such that the estimated reverberation signal component corresponds to the audio input signal in the reverberation signal period.

3. The method of claim 1, wherein the smoothing filter comprises a first order recursive filter.

4. The method of claim 1, further comprising:
determining magnitudes of the transferred audio input signal,
attenuating the determined magnitudes of the transferred audio input signal before applying a smoothing filter.

5. The method of claim 4, wherein a ratio of the ambient signal component to the audio input signal is determined, and the determined magnitudes are attenuated based on the ratio.

6. The method of claim 4, further comprising:
extracting fluctuations from attenuated magnitudes of the transferred input signal, and
adding the extracted fluctuation to an output of the smoothing filter to determine the estimated ambient signal component.

7. The method of claim 1, further comprising the steps of:
determining an onset in the audio input signal where at least a portion of the dry signal component is present in the audio input signal, and
determining an offset in the audio input signal where at least the portion of the dry signal component is no longer present in the audio input signal.

8. The method of claim 7, wherein a reverberation signal period is determined as starting after the offset and ending when an output of the smoothing filter meets a predefined criterion, and wherein comparing the estimated reverberation signal component to the audio input signal in the reverberation signal period is carried out in a part of the audio input signal after the determined offset.

9. The method of claim 7, further determining a peak follower signal with exponential decay from the transferred input signal which is then attenuated by a factor smaller than 1, wherein the offset is detected when the audio input signal crosses the peak follower signal at a point where the audio input signal decreases.

10. The method of claim 7, further comprising:
determining a ratio of the ambient signal component to the audio input signal, wherein determining the ratio includes;
determining an amplitude of the audio input signal in a last sample of the audio input signal before the offset,
determining an amplitude of the audio input signal in a first sample of the audio input signal after the offset, and
determining the ratio based on the amplitude in the last sample and the amplitude in the first sample.

11. The method of claim 10, wherein the step of determining the ratio based on the amplitude in the last sample and the amplitude in the first sample is repeated several times for different offsets in the audio input signal, to determine an average ratio used to attenuate magnitudes of the transferred input signal, wherein a length of the dry signal component is determined for the different offsets, wherein the longer the determined dry signal component is the more the corresponding ratio contributes to the average ratio.

12. The method of claim 1, wherein the estimated ambient signal component generated from an output of the smoothing filter is subtracted from the audio input signal to determine the dry signal component.

13. An audio module configured to separate an audio input signal into a dry signal component and an ambient signal component, the audio module comprising a memory and at least one processing unit, the memory comprising instructions executable by the at least one processing unit, to cause the audio module to:
generate a transferred input signal including transferring the audio input signal into a frequency space,
apply a smoothing filter to the transferred input signal to generate an estimated ambient signal component, wherein the smoothing filter suppresses the dry signal component of the audio input signal to generate the estimated ambient signal component,
determine the dry signal component based on the estimated ambient signal component, and
determine the ambient signal component based on the determined dry signal component and the audio input signal,
determine magnitudes of the transferred audio input signal,
attenuate the determined magnitudes of the transferred audio input signal before applying a smoothing filter,
extract fluctuations from attenuated magnitudes of the transferred input signal, and
add the extracted fluctuation to an output of the smoothing filter to determine the estimated ambient signal component.

14. A method for separating an audio input signal into a dry signal component and an ambient signal component, the method comprising:
transferring the audio input signal into a frequency space to generate a transferred input signal,
applying a smoothing filter to the transferred input signal to generate an estimated ambient signal component,
determining the dry signal component based on the estimated ambient signal component, and
determining the ambient signal component based on the determined dry signal component and the audio input signal, wherein applying the smoothing filter to the transferred input signal to generate the estimated ambient signal component includes suppressing the dry signal component of the audio input signal with the smoothing filter to generate the estimated ambient signal component, wherein the audio input signal comprises a combined signal period, where the ambient signal component and the dry signal component are present and a reverberation signal period following the combined signal period, and where substantially only the ambient signal is present, the method further comprising:

detecting the reverberation signal period in the audio input signal, determining an estimated reverberation signal period component in the estimated ambient signal component in the reverberation signal period, and comparing the estimated reverberation signal component to the audio input signal in the reverberation signal period to determine a smoothing coefficient used in the smoothing filter for generating the estimated ambient signal component, wherein the method further comprises:
  determining whether the reverberation signal period is currently present in the audio input signal,
  utilizing the audio input signal in the reverberation signal period for the estimated ambient signal component if the reverberation signal period is present in the audio input signal, and
  utilizing an output of the smoothing filter for the estimated ambient signal component if the reverberation signal period is not present in the audio input signal.

15. The method of claim 14, wherein the smoothing filter comprises a first order recursive filter.

16. The method of claim 14, further comprising:
determining magnitudes of the transferred audio input signal, and
attenuating the determined magnitudes of the transferred audio input signal before applying a smoothing filter.

17. The method of claim 16, wherein a ratio of the ambient signal component to the audio input signal is determined, and the determined magnitudes are attenuated based on the ratio.

18. A method for separating an audio input signal into a dry signal component and an ambient signal component, the method comprising:
  generating a transferred input signal including transferring the audio input signal into a frequency space,
  applying a smoothing filter to the transferred input signal to generate an estimated ambient signal component,
  determining the dry signal component based on the estimated ambient signal component, and
  determining the ambient signal component based on the determined dry signal component and the audio input signal,
  wherein applying the smoothing filter to the transferred input signal to generate the estimated ambient signal component includes suppressing the dry signal component of the audio input signal with the smoothing filter to generate the estimated ambient signal component,
  determine magnitudes of the transferred audio input signal,
  attenuating the determined magnitudes of the transferred audio input signal before applying a smoothing filter,
  extracting fluctuations from attenuated magnitudes of the transferred input signal, and
  adding the extracted fluctuation to an output of the smoothing filter to determine the estimated ambient signal component.

19. A method for separating an audio input signal into a dry signal component and an ambient signal component, the method comprising:
  generating a transferred input signal including transferring the audio input signal into a frequency space,
  applying a smoothing filter to the transferred input signal to generate an estimated ambient signal component,
  determining the dry signal component based on the estimated ambient signal component, and
  determining the ambient signal component based on the determined dry signal component and the audio input signal,
  wherein applying the smoothing filter to the transferred input signal to generate the estimated ambient signal component includes suppressing the dry signal component of the audio input signal with the smoothing filter to generate the estimated ambient signal component,
  determining an onset in the audio input signal where at least a portion of the dry signal component is present in the audio input signal, and
  determining an offset in the audio input signal where at least the portion of the dry signal component is no longer present in the audio input signal, p1 wherein a reverberation signal period is determined as starting after the offset and ending when an output of the smoothing filter meets a predefined criterion, and
  wherein comparing the estimated reverberation signal component to the audio input signal in the reverberation signal period is carried out in a part of the audio inout signal after the determined offset.

20. A method for separating an audio input signal into a dry signal component and an ambient signal component, the method comprising:
  generating a transferred input signal including transferring the audio input signal into a frequency space,
  applying a smoothing filter to the transferred input signal to generate an estimated ambient signal component,
  determining the dry signal component based on the estimated ambient signal component, and
  determining the ambient signal component based on the determined dry signal component and the audio input signal,
  wherein applying the smoothing filter to the transferred input signal to generate the estimated ambient signal component includes suppressing the dry signal component of the audio input signal with the smoothing filter to generate the estimated ambient signal component,
  determining an onset in the audio input signal where at least a portion of the dry signal component is present in the audio input signal,
  determining an offset in the audio input signal where at least the portion of the dry signal component is no longer present in the audio input signal, and p1 determining a peak follower signal with exponential decay from the transferred input signal which is then attenuated by a factor smaller than 1, wherein the offset is detected when the audio inout signal crosses the peak follower signal at a point where the audio input signal decreases.

21. A method for separating an audio input signal into a dry signal component and an ambient signal component, the method comprising:
- generating a transferred input signal including transferring the audio input signal into a frequency space,
- applying a smoothing filter to the transferred input signal to generate an estimated ambient signal component,
- determining the dry signal component based on the estimated ambient signal component, and
- determining the ambient signal component based on the determined dry signal component and the audio input signal,
- wherein applying the smoothing filter to the transferred input signal to generate the estimated ambient signal component includes suppressing the dry signal component of the audio input signal with the smoothing filter to generate the estimated ambient signal component,
- determining an onset in the audio input signal where at least a portion of the dry signal component is present in the audio input signal,
- determining an offset in the audio input signal where at least the portion of the dry signal component is no longer present in the audio input signal, and
- determining a ratio of the ambient signal component to the audio input signal, wherein determining the ration includes: p1 determining an amplitude of the audio inout signal in a last sample of the audio input signal before the offset, p1 determining an amplitude of the audio inout signal in a first sample of the audio input signal before the offset, and p1 determining the ratio based on the amplitude in the last sample and the amplitude in the first sample.

* * * * *